July 7, 1925.
C. V. HUGHES
1,544,583
WEEDING ATTACHMENT FOR CULTIVATORS
Filed Nov. 7, 1921
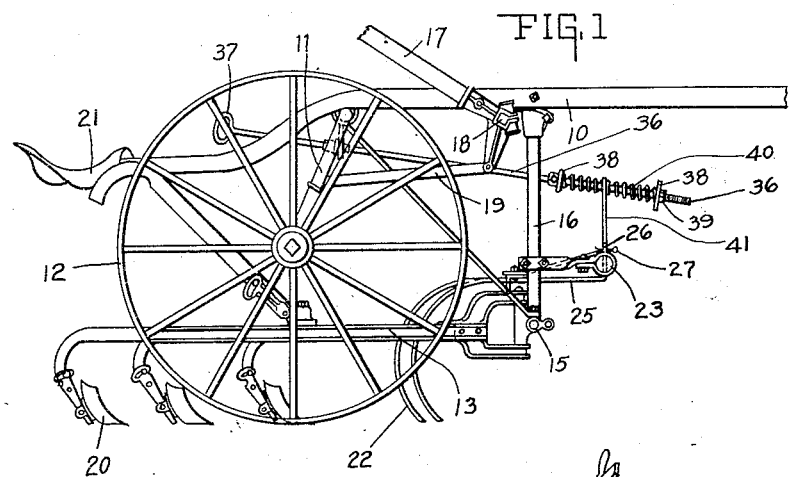
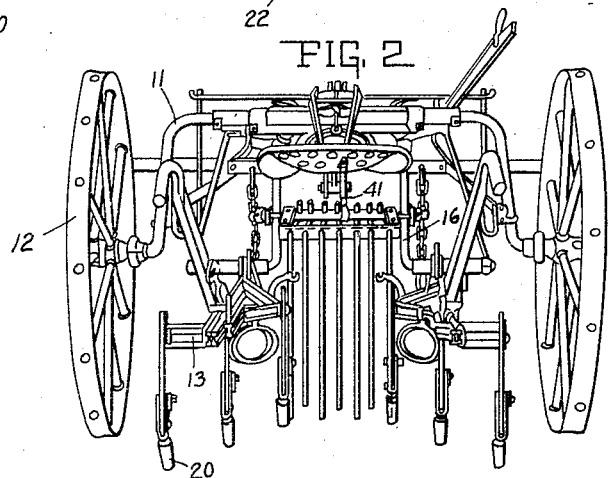
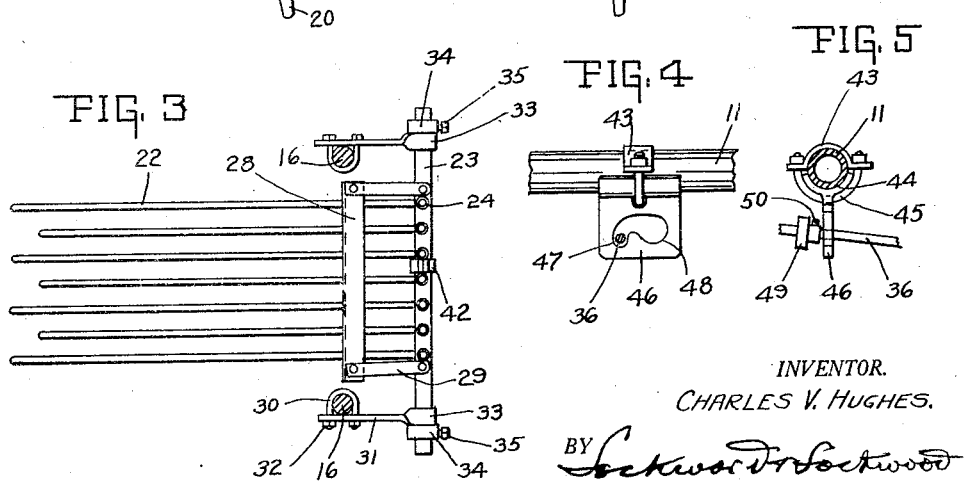
INVENTOR.
CHARLES V. HUGHES.
BY Lockwood & Lockwood
ATTORNEYS.

Patented July 7, 1925.

1,544,583

UNITED STATES PATENT OFFICE.

CHARLES V. HUGHES, OF CHRISMAN, ILLINOIS.

WEEDING ATTACHMENT FOR CULTIVATORS.

Application filed November 7, 1921. Serial No. 513,366.

*To all whom it may concern:*

Be it known that I, CHARLES V. HUGHES, a citizen of the United States, and a resident of Chrisman, county of Edgar, and State of Illinois, have invented a certain new and useful Weeding Attachment for Cultivators; and I do hereby declare that the following is a full, clear, and exact description thereof, reference being had to the accompanying drawings, in which like numerals refer to like parts.

This invention relates to a weeding mechanism and the means for attaching the same to a cultivator.

The chief object of this invention is to provide a cultivator with weeding means so that said cultivator will be adapted to weed corn or the like and simultaneously cultivate the earth adjacent thereto.

Another object of the invention is to associate the weeding means with the cultivator in such a manner that said weeding means may be movable into weeding or non-weeding position as desired and be operable from the seat of the cultivator.

The chief feature of the invention consists in the particular arrangement of the weeding attachment and its mounting upon the cultivator, and another feature of the invention consists in the particular construction of the weeding means.

The full nature of the invention will be understood from the accompanying drawings and the following description and claim.

In the drawings, Fig. 1 is a side elevational view of a two-wheel cultivator with the invention associated therewith. Fig. 2 is a rear view of said cultivator and the invention. Fig. 3 is a top plan view of the weeding tines and the support therefor. Fig. 4 is an enlarged rear view of the control rod and latch. Fig. 5 is a view taken at right angles to Fig. 4 and illustrates the same parts.

In the drawings 10 indicates the main frame of a cultivator which is supported upon a U-shaped axle 11. The U-shaped axle 11 is provided with outwardly extending spindle portions which support the wheels 12. The cultivator sub-frame 13 is pivotally supported at 15 upon suitable depending L-shaped bars 16. A lever 17 pivotally supported at 18 through the link 19 is adapted to elevate and lower the sub-frame 13 as desired so as to position the usual cultivating shovels 20 at any desired elevation for cultivating to any desired depth or for removing the shovels from the cultivating position. The frame 10 also supports a suitable seat 21. As shown clearly in Figs. 1 and 2, the sub-frame 13 carries six shovels 20, and said shovels are positioned in angular relation and in spaced relation with each other. The two forward shovels are closest to each other and the two rearward shovels are farthest from each other. The two forward shovels forming the apex of the angle are spaced apart so as to straddle the corn row which is to be cultivated and permit corn plants to pass between the two groups of shovels.

It has been found that vines growing in the field cannot be destroyed by the shovels, and likewise other weeds cannot be destroyed by said shovels. Suitable weeding means therefor is provided, and said weeding means comprises a plurality of curved tines 22, which tines are positioned so that they extend forwardly of the shovels and substantially at the apex of the angle formed by the shovels. Thus the tines are adapted to remove the vines and weeds from the corn, yet permit the corn plants to pass between the tines. The removed weeds and vines are thereupon covered by the cultivating shovels. It will be noted in Figs. 1 and 2 that the ends of the curved tines are herein illustrated as positioned in two rows and the tines are further positioned so that the tines in one row are staggered with relation to the tines of the other row.

The particular means for securing the tines 22 in the aforesaid relation comprise a supporting rock shaft 23 which is provided with openings 24 extending therethrough. The curved tines 22 have a straight portion 25 which terminates in an angular end portion 26, and said angular end portion is adapted to extend through and project from the opening 24 in the supporting shaft 23. A suitable cotter pin 27 secures said tine in said hole and to the supporting member. A spacing bar or other suitable equivalent means 28 loosely secures the tines in spaced relation with each other, and the curvature of the tines positions the same in the plurality of rows heretofore described. The spacing bar 28 is secured to the supporting shaft 23 by suitable means, such as the links 29 thereby forming a parallelogram support. This construction provides flexibility when the same is necessary. The means for supporting the aforesaid weeding means upon the L-shaped bars 16, see Figs. 2 and 3, comprises a pair of U-bolts 30, which with plates 31 surround said bar 16 and are secured thereto by the nuts 32. The bracket 31 extends forwardly from the rod 16 and terminates in a bearing 33 for rotatably supporting the shaft 23. Suitable collar means 34 upon each end of the shaft 23 limits the longitudinal movement thereof by being secured to said shaft by the set screws 35.

The means for moving the weeding means heretofore described into and out of weeding position and for maintaining said means in said position is illustrated in Figs. 1, 3, 4 and 5. A shifting rod 36 having a suitable handle portion 37 positioned adjacent the seat 21 is provided at its other end with a pair of spring retaining members 38, one or both of said members being adjustably positioned upon said rod, as by means of the nut 39. Suitable spring means 40 concentric with said rod is interposed between the two spring retaining means 38, which means may be a washer or the like. The spring means 40 is divided. The rod 36 slidably supports a depending strap 41, the spring means 40 being positioned upon opposite sides of the strap. The strap 41 at its lower end is provided with a clamping portion 42 adapted to encircle the shaft 23 so that as said strap 41 is moved forwardly or rearwardly, said shaft 23 will be rocked upon its pivotal supports 33 to move the tines 22 into and out of weeding position. The means for maintaining said actuating rod 36 in either the weeding or non-weeding position comprises a curved strap 43 associated with a curved portion 44. Said strap and curved portion encircle the axle 11, see Figs. 4 and 5. A U-bolt 45 rigidly secures said members to the axle 11. The portion 44 is provided with a depending plate portion 46 which is slotted to form a small seat 47 and a large seat 48. Said seat portions 47 and 48 communicate with each other. Positioned upon the rod 36 is a collar 49 adjustably secured to said rod by the set screw 50. It will be observed that the seat 48 is an opening large enough to permit the collar 49 to be passed through the same; while the seat 47 is an opening communicating with the opening 48, but which prevents the passage of said collar therethrough. Therefore, when the collar is positioned upon the upper side of the depending plate 46, as shown in Fig. 1, the lower spring 40 tends to yieldingly maintain the curved tines 22 in the weeding position. However, when the rod 36 is moved transversely of the plate 46 so as to position the collar 49 in registration with the opening 48 and permit the passage of said collar through said opening, the upper portion of the spring 40 will be compressed and said compressional force exerted through the strap 41 tilts the shaft 23 to remove the weeding tines from the weeding position.

The invention claimed is:

The combination with a cultivator and a weeding attachment pivotally supported thereby, of a plate rigidly secured to said cultivator and provided with an aperture having an enlarged portion, a rod extending through the plate at the aperture, a collar secured upon said rod and passable through the aperture at the enlarged portion thereof, said rod being normally seatable in the reduced portion and retained therein by said collar, and a connection between said pivotally supported weeding attachment and said rod.

In witness whereof, I have hereunto affixed my signature.

CHARLES V. HUGHES.